US007547122B1

(12) United States Patent
Serra et al.

(10) Patent No.: US 7,547,122 B1
(45) Date of Patent: Jun. 16, 2009

(54) AREA SECURITY LIGHT WITH ADAPTABLE MOUNTING HARDWARE

(75) Inventors: James T. Serra, Long Beach, CA (US); John H. Wandrey, Long Beach, CA (US); Timothy E. Monroe, Lincoln, CA (US)

(73) Assignee: Jimway Inc., Rancho Dominguez, CA (US)

( * ) Notice: Subject to any disclaimer, the term of this patent is extended or adjusted under 35 U.S.C. 154(b) by 126 days.

(21) Appl. No.: 11/614,783

(22) Filed: Dec. 21, 2006

Related U.S. Application Data

(60) Provisional application No. 60/754,105, filed on Dec. 27, 2005.

(51) Int. Cl.
*B60Q 3/00* (2006.01)

(52) U.S. Cl. ....................... 362/370; 362/147; 362/253; 362/362; 362/368; 362/455

(58) Field of Classification Search ................. 362/147, 362/253, 362, 368, 370, 435, 455
See application file for complete search history.

(56) References Cited

U.S. PATENT DOCUMENTS 3,319,060 A * 5/1967 Bartley ....................... 362/311
4,152,757 A 5/1979 Bilson et al.
4,156,272 A 5/1979 Wandler
4,222,093 A 9/1980 Garcia et al.
4,345,306 A 8/1982 Summey
4,472,768 A 9/1984 Quioque
4,793,581 A 12/1988 Bilson et al.
6,095,665 A 8/2000 Drake et al.
6,123,435 A 9/2000 Wang
6,155,701 A 12/2000 Leen
6,241,369 B1 6/2001 Mackiewicz
6,439,750 B2 8/2002 Klaus et al.
6,467,928 B2 10/2002 Crelin
6,692,140 B2 2/2004 Wu

* cited by examiner

*Primary Examiner*—Sandra L O'Shea
*Assistant Examiner*—Meghan K Dunwiddie
(74) *Attorney, Agent, or Firm*—Paul Y. Feng; Fulwider Patton LLP

(57) ABSTRACT

A security lighting system is provided for convenient mounting to a standard electrical junction box. The security light fixture includes a housing, a cantilevered arm extending from the housing, and a back plate on an end of the cantilevered arm. The back plate has a reinforced attachment structure capable of supporting the bending moment of the heavy, cantilevered light structure. The attachment structure may include, for example, a reinforced cone. The back plate and cantilevered arm may be integrally formed for convenient manufacturing and added structural strength. The fixture may include a cross bar for attaching to the junction box, with the cross bar serving to interconnect the junction box with the back plate. In one embodiment, the security lighting system provides an option of electrically interconnecting the system to a standard j-box or, alternatively, to an electrical conduit, as desired. In another embodiment, the cross-section of the back plate may have a different shape than the cross-section of the junction box.

18 Claims, 11 Drawing Sheets

AREA SECURITY LIGHT WITH ADAPTABLE MOUNTING HARDWARE

CROSS-REFERENCE TO RELATED APPLICATION

This is a non-provisional utility patent application based on Provisional Application Ser. No. 60/754,105, filed Dec. 27, 2005 and titled, "AREA SECURITY LIGHT WITH ADAPTABLE MOUNTING HARDWARE," from which priority is hereby claimed and which is hereby incorporated by reference.

BACKGROUND OF THE INVENTION

Area security lights are usually mounted outdoors in order to project a wide swath of visible light. They are employed at a variety of facilities, such as commercial (shopping malls, stores, sports stadiums, tennis courts), industrial (factories, warehouses, farms), and government or military facilities (airports, military bases). A light is typically mounted to a wall, a pole, or other structure. To achieve the largest area of lighting, the area security light fixture has a horizontally extending, cantilevered arm to hold the light source away from the wall, pole, or other structure. By moving the light source away from the wall, pole, or building, the cantilever arm gives the security light greater light dispersion around a 360° circumference.

Installation of this type of light has been difficult. Typically, the end user has been required to nail or bolt the light to the structure, then run an electrical conduit to the light. Often it has been inconvenient and time consuming to run the conduit to the light. It would be more convenient to mount the light to a standard outlet box. But the cantilevered arm must support bulky and heavy electrical components, such as a ballast, a transformer, a starter, and the like, which are normally needed for metal halide, mercury vapor, high pressure sodium, fluorescent, and sometimes halogen type light sources of security light systems.

What has been needed to this point is a mounting system that allows an end user to conveniently mount a heavy security lighting system to a standard outlet box. It is also desirable at times to provide the end user with a security lighting system that can be conveniently interconnected with the user's choice of a either an outlet box or an electrical conduit. The invention disclosed herein meets these and other needs.

SUMMARY OF THE INVENTION

The present invention provides a security lighting system that can be conveniently mounted to a standard electrical outlet. In an alternative embodiment, the security lighting system can be electrically interconnected to the user's choice of either a standard electrical outlet or a conduit. In this way, a single security light mounting structure may be used in a variety of different mounting configurations.

According to one embodiment of the invention, a security light fixture has a housing, a cantilevered arm extending from the housing, and a back plate on an end of the cantilevered arm. The back plate may optionally be reinforced with ribs. The back plate preferably has a reinforced attachment point structure capable of supporting a bending moment of at least 60 in-lbf. (inch-pounds-force), in order to support a heavy security light assembly. The reinforced attachment point structure may be any of a variety of different structures. In one embodiment, the reinforced attachment point structure is a reinforced cone having a threaded opening to receive, for example, a threaded mounting shaft.

Embodiments of the present invention may have different features. For instance, the ribs may extend in a crossing pattern. The back plate and arm may be integrally formed, for convenient manufacturing and added structural strength. The security light fixture may include a cross bar for attaching to an electrical junction box or outlet box. The cross bar may have, for example, one or more mounting slots and/or mounting holes for mounting the cross bar to an outlet box or other structure. The cross bar may be attached to the back plate with an attachment member such as a threaded stud.

For adaptability, some embodiments of the security light may include a removable bottom plate. The bottom plate may have an opening that can be covered up as desired. For example, a cover may be used to cover the opening when the light is to be mounted to an electrical outlet box. But, in a second mode that is typically employed when connecting the security light to an electrical conduit rather than to an outlet box, the cover is removed from the opening.

It is noted that the cross bar mounting system may provide additional mounting versatility when, for instance, the outlet box has an unusual cross-sectional shape. That is, the back plate may have a first cross-section, while the outlet box has a second, different cross-section. This may be useful when, as one example, the back plate has a square cross-section and the outlet box has a circular, triangular, or other cross-section.

It is to be understood that the present invention is not limited to the specific examples described herein. For example, while the mounting structure of specific examples of the present invention may typically be made of steel, other suitable materials may be used. Also, it should be understood that there are numerous features and variations that are described herein that form part of the invention. Consequently, the present invention is to be understood with reference to the detailed description below, the drawings, and the claims, and is not limited by this summary or by description of any one particular embodiment.

DETAILED DESCRIPTION OF THE PREFERRED EMBODIMENTS

Figure 1:
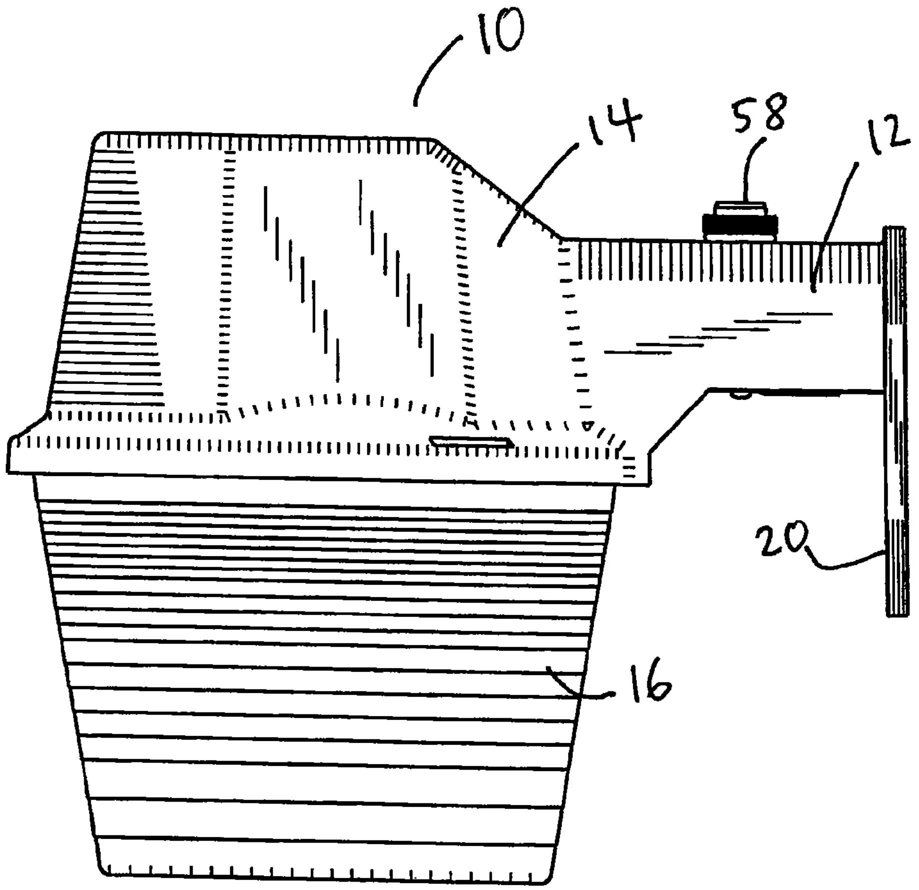
FIG. 1 is a right side elevational view of a security light fixture according to one embodiment of the present invention.
Figure 3:
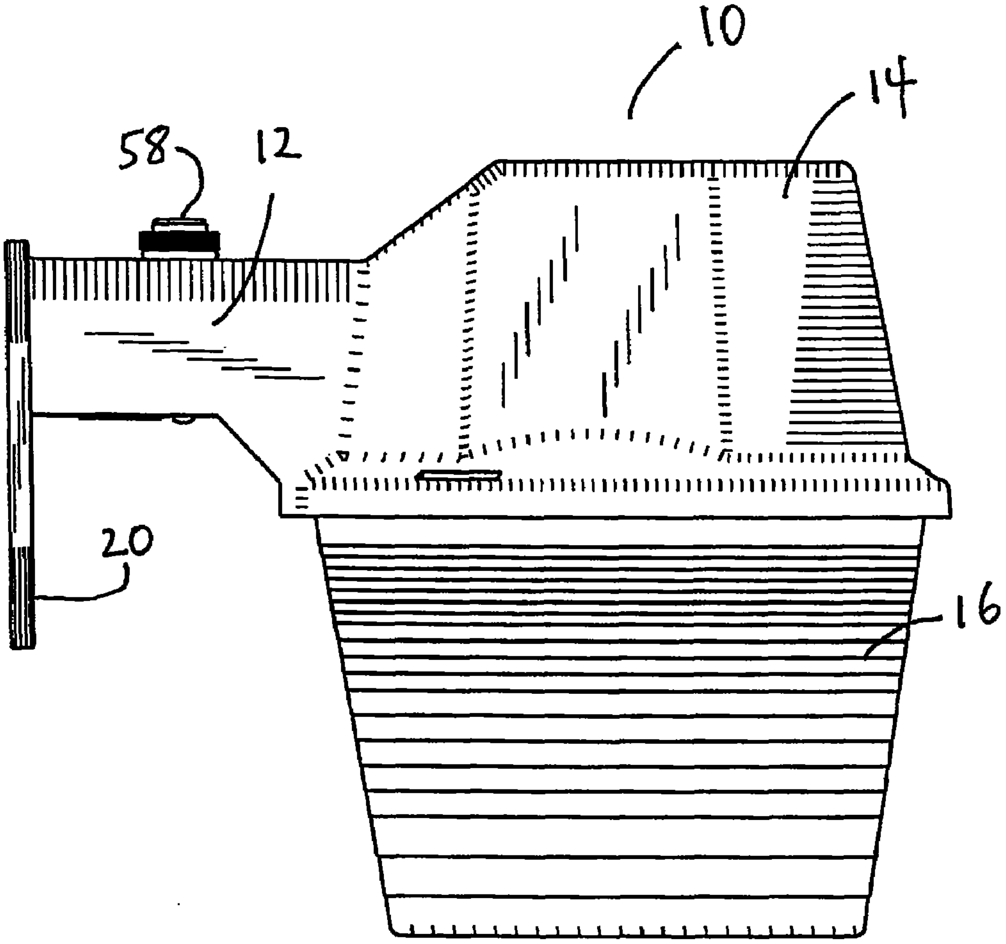
FIG. 3 is a left side elevational view of the security light fixture of FIG. 1.
Figure 4:
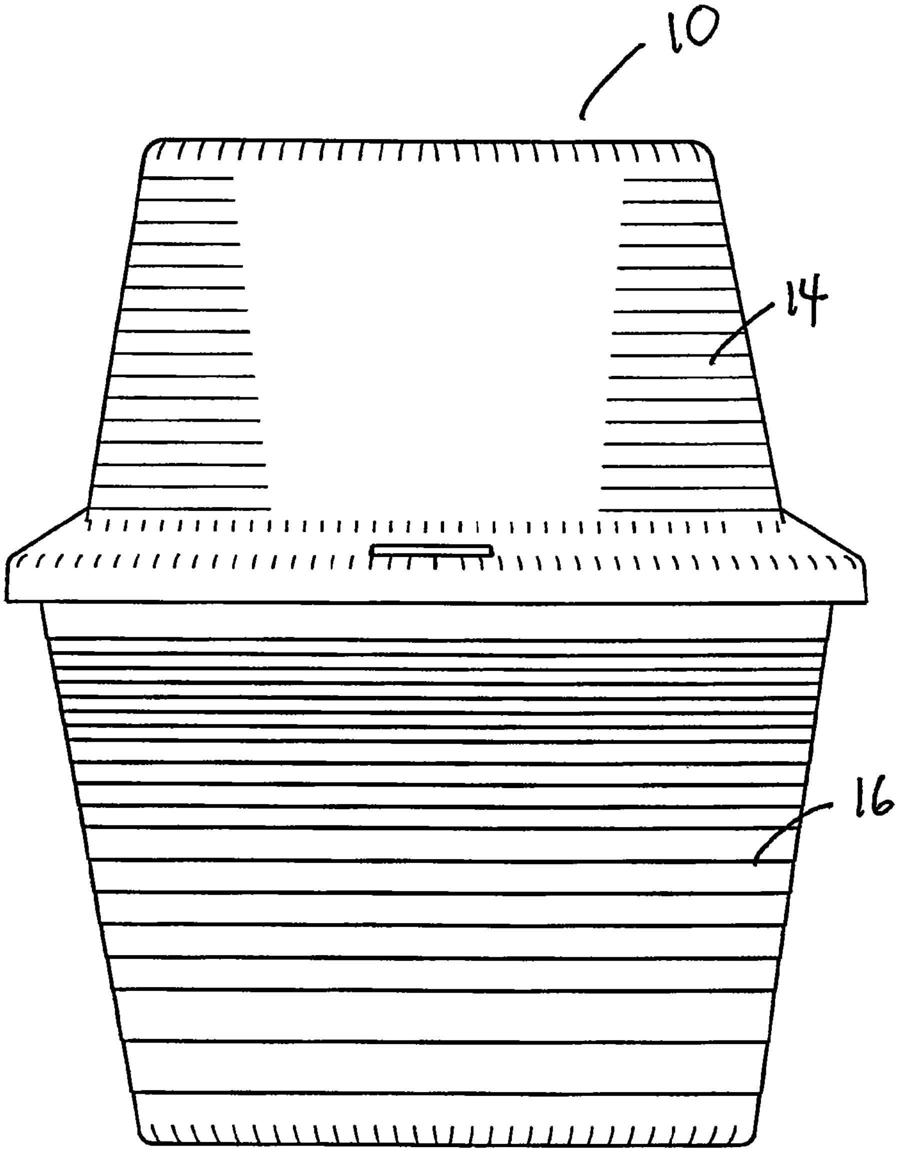
FIG. 4 is a front elevational view of the security light fixture of FIG. 1.
Figure 5:
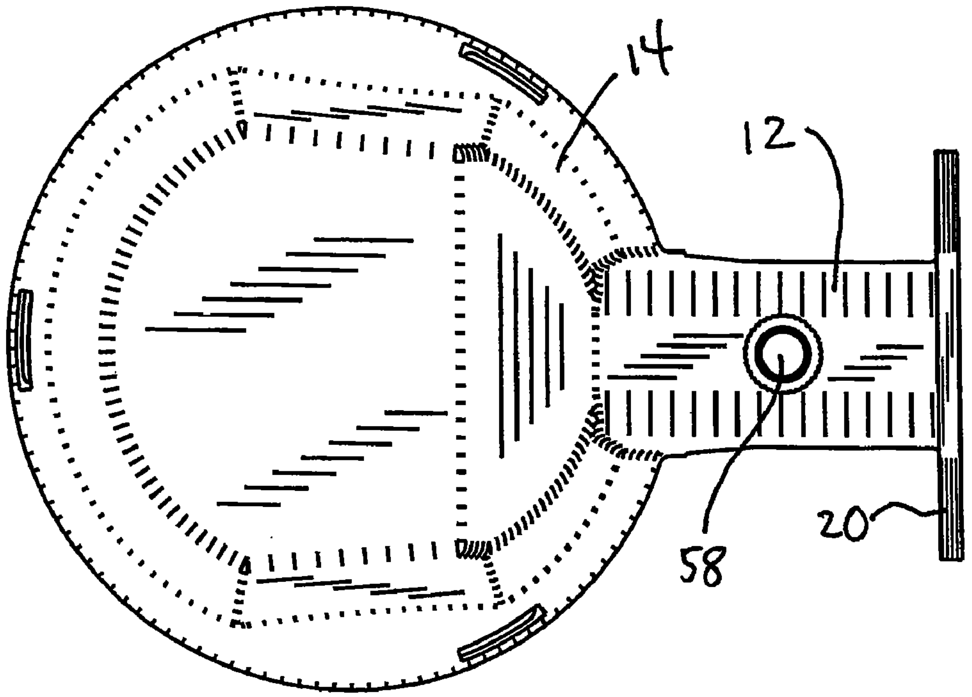
FIG. 5 is a top plan view of the security light fixture of FIG. 1.

Turning to the drawings, FIGS. 1, 3, and 4 are right side, left side, and front elevational views, respectively, of a preferred embodiment area security light fixture 10. To achieve the largest area of lighting, the area security light fixture is designed with the light source held away from the wall, pole, building or other structure on which it is mounted by a horizontally extending, cantilevered arm 12. As discussed previously, moving the light source away from the wall, pole, or building thus gives greater light dispersion around a 360° circumference. Consequently, the cantilevered arm 12 plays an important role in facilitating the function of the security light.

Figure 6:
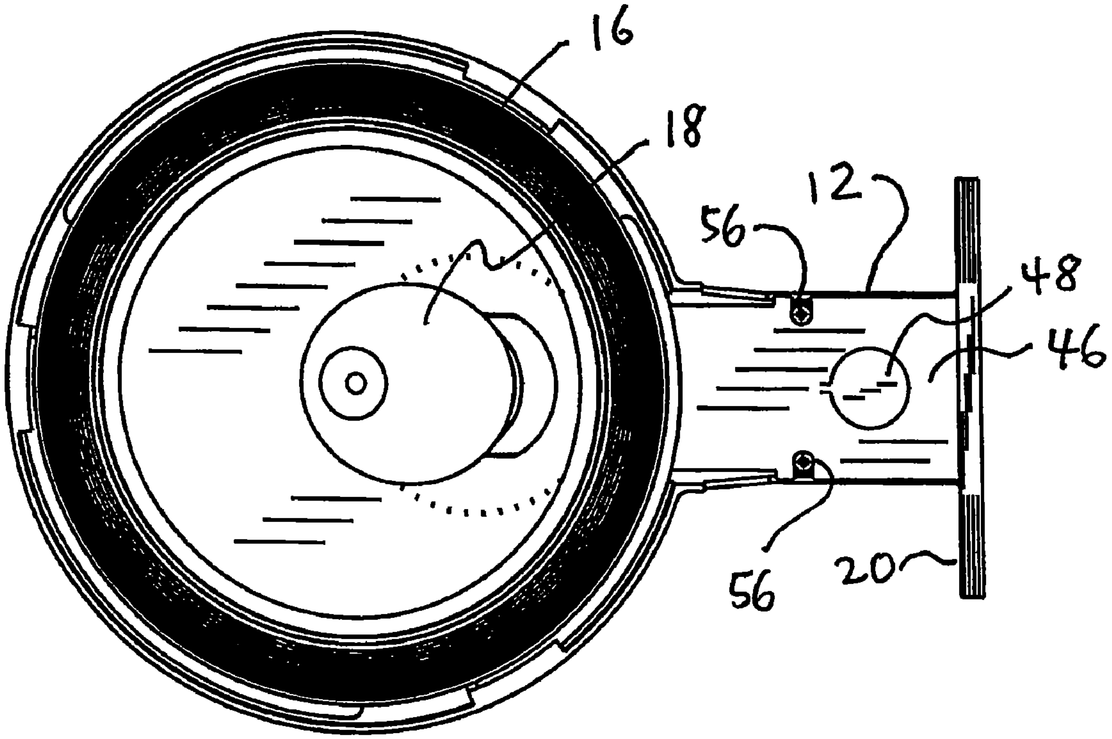
FIG. 6 is a bottom view of the security light fixture of FIG. 1.
Figure 7:
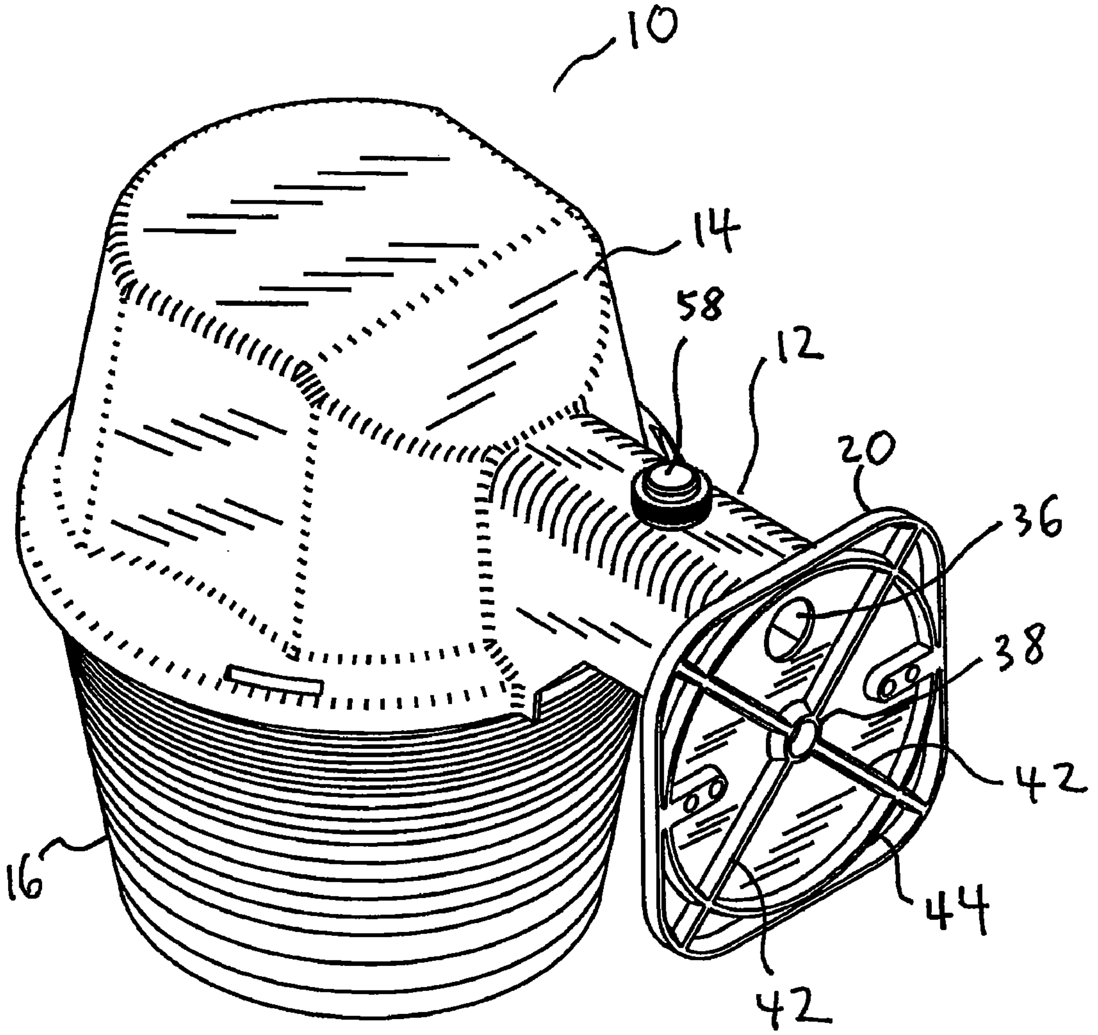
FIG. 7 is a rear perspective view of the security light fixture of FIG. 1.
Figure 8:
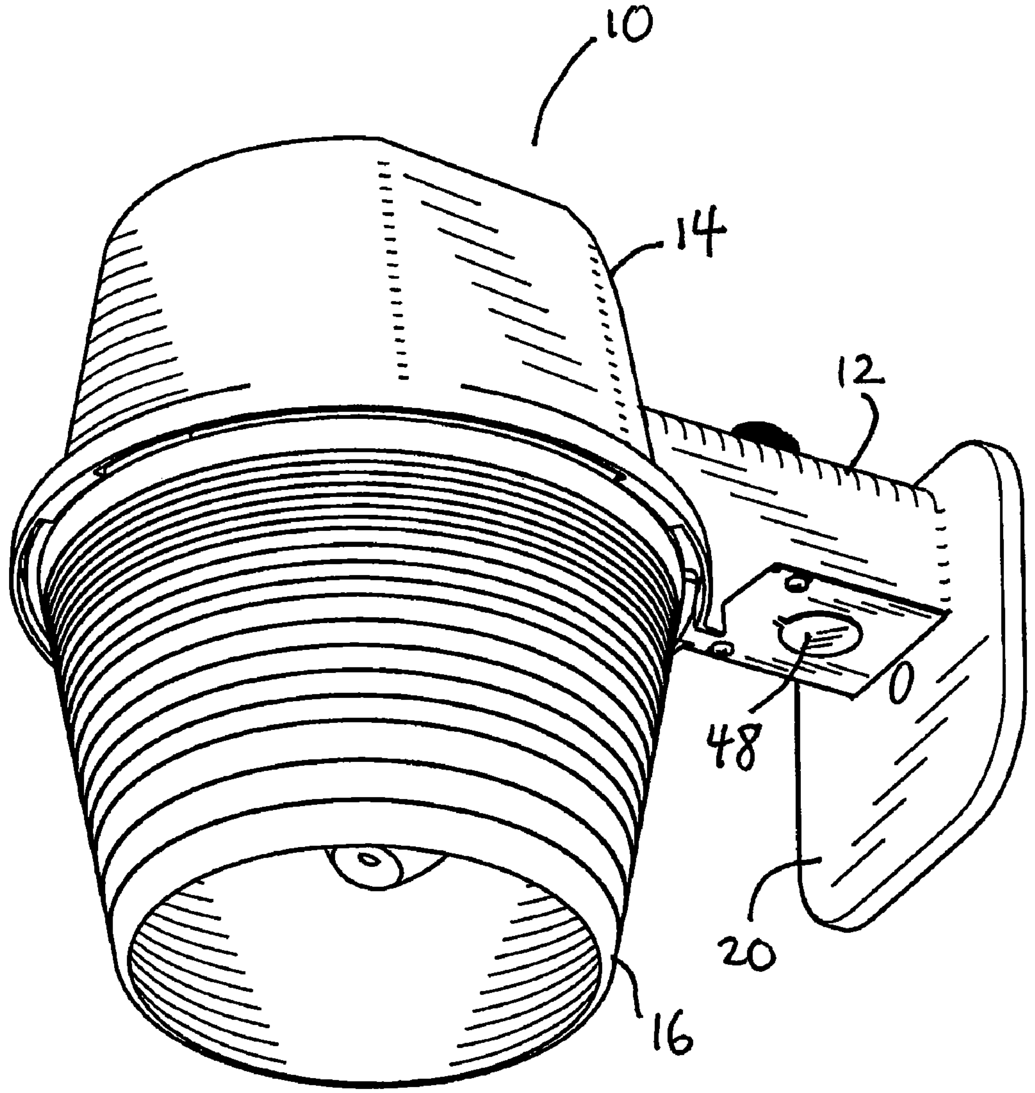
FIG. 8 is a front perspective view of the security light fixture of FIG. 1.

The horizontal arm 12 usually attaches to a canopy or upper housing 14. A large housing is needed to contain the electrical components for the light source 18. FIG. 6 is a bottom view of the area security light fixture 10. Beneath the canopy 14 is the transparent or translucent lens 16 covering the light source, and an optional light reflector. The lens 16 is placed beneath the canopy 14 since the security light 10 is mounted high above ground and the light source 18 is intended to project light laterally and downward toward the ground in a wide area.

The canopy or upper housing 14 contains the electrical components used to control and power the light source 18. An optional photocell 58 can be added to automatically control the on/off operation of the light source 18 based on the intensity of the daylight. Control systems for use with the photocell 58 are known in the art. By incorporating the photocell 58 into the operation of the light fixture 10, a time-of-day timer or an on/off switch is no longer needed.

Placing the electrical components in the housing 14 under the canopy is preferable to avoid having to create a space or chamber in the wall or pole to contain the bulky electrical components for the light source 18. For area security light fixtures, the bulky and heavy electrical components usually include a ballast, a transformer, a starter, and the like. These components are usually needed for metal halide, mercury vapor, high pressure sodium, fluorescent, and sometimes halogen type light sources, such as can be used in conjunction with a security light system.

With a glass lens 16, a metal housing 14, a glass light source 18, and large electrical components, the assembled area security light fixture 10 tends to be large and heavy. To secure such mass and weight to a wall, pole, or building in a cantilevered arrangement, the conventional method is to secure the fixture to a wall or other structure with nails, screws or the like, and then electrically interconnect the light to a power source via a metal pipe or conduit.

Figure 9:
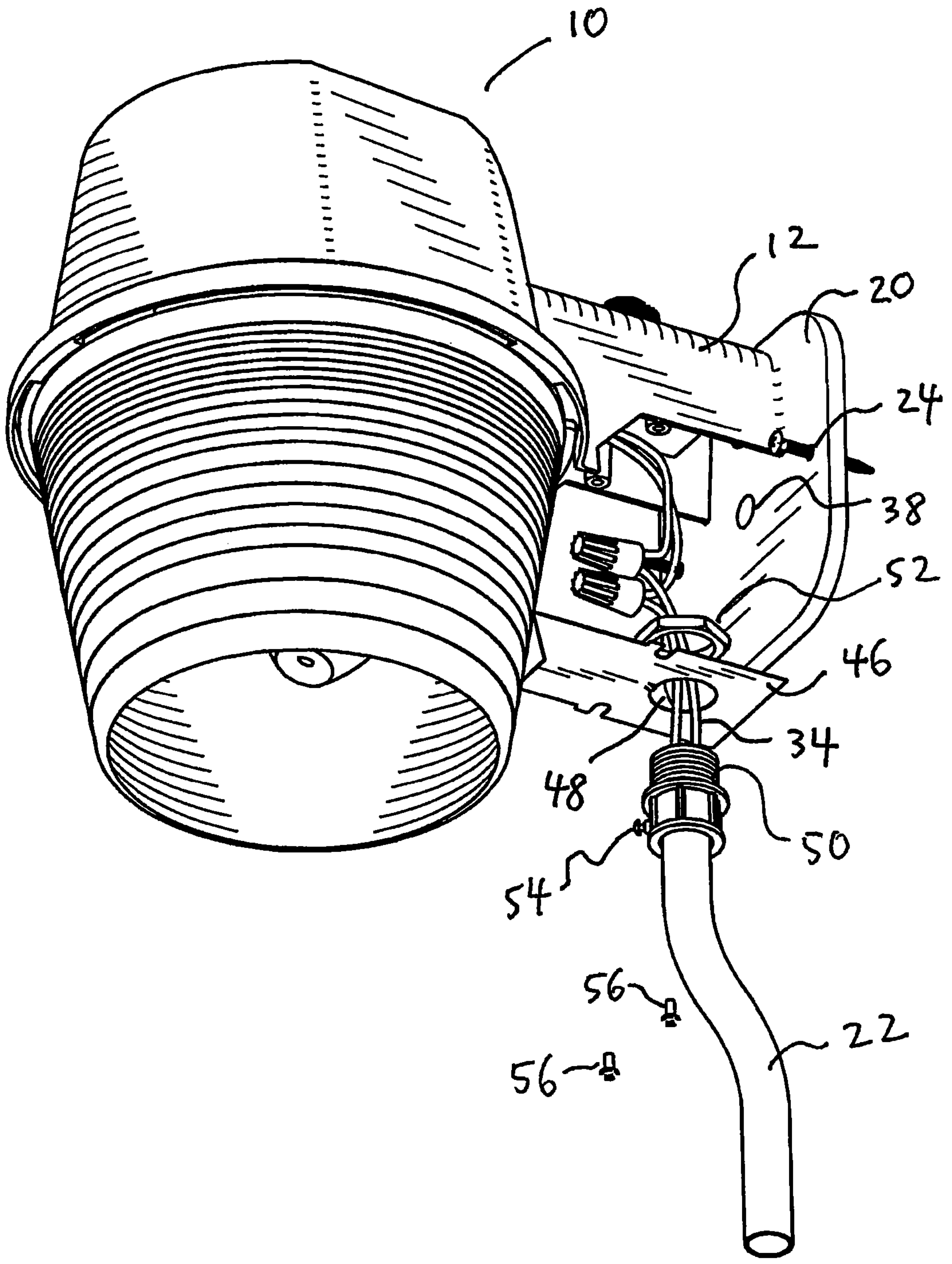
FIG. 9 is a front perspective view of the security light fixture of FIG. 1, in a mode for interconnecting with an electrical conduit.

The conduit or metal pipe has been typically used because it is common for area security light fixtures to be placed at outdoor locations where there is no electrical supply. Hence, an electrician must run a power line from an AC source to where the area security light fixture is to be mounted, and the wires are carried in the metal pipe or conduit—for the portions not buried underground—for protection from weather and rodents. As seen in FIG. 9, the metal pipe or conduit 22 is then run up the wall or pole where the area security light fixture 10 is to be mounted. Conveniently, the metal pipe 22 is then fitted inside the cantilevered arm 12 of the area security light fixture 10 to help carry the majority of the weight of the fixture. Electrical wires from the conduit 22 can then be connected to the internal electrical components of the area security light fixture 10 to power the light source 18. A back plate 20 of the area security light fixture 10 may have screw mounting holes 24 enabling the fixture to be further screwed, nailed, or secured to the wall, pole, or the like.

Figure 10:
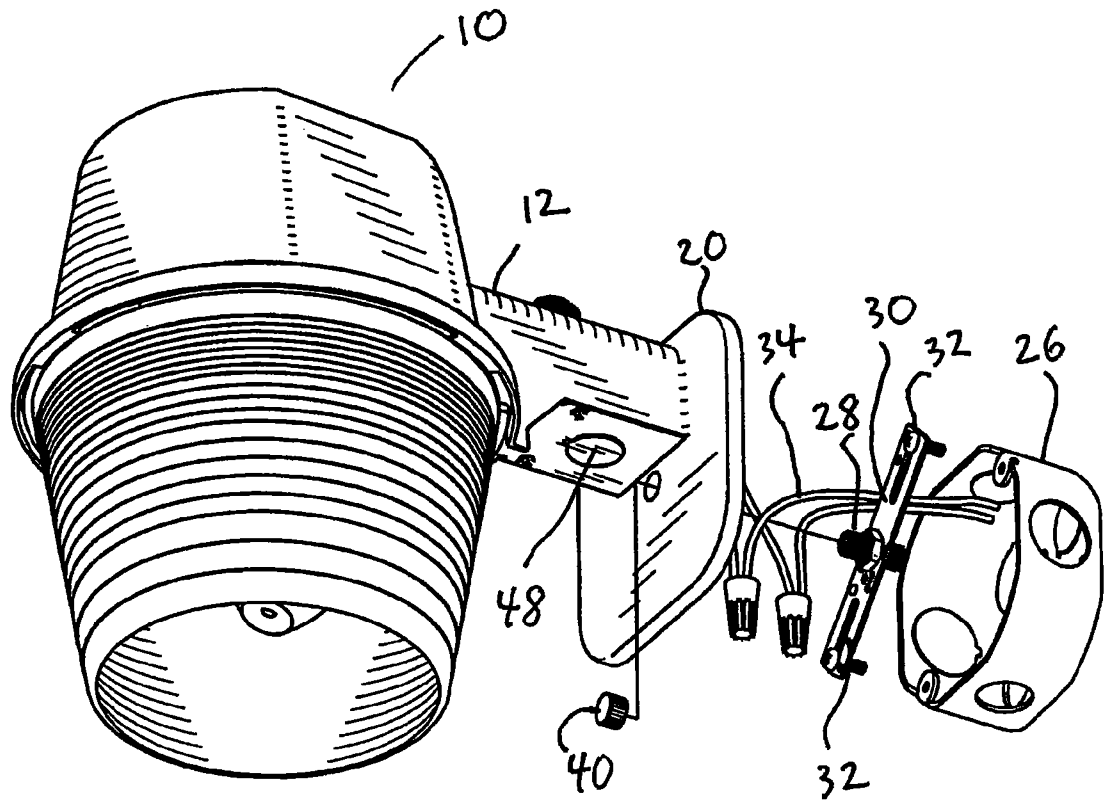
FIG. 10 is a front perspective view of the security light fixture of FIG. 1, in a mode for interconnecting with an electrical outlet box.
Figure 11:
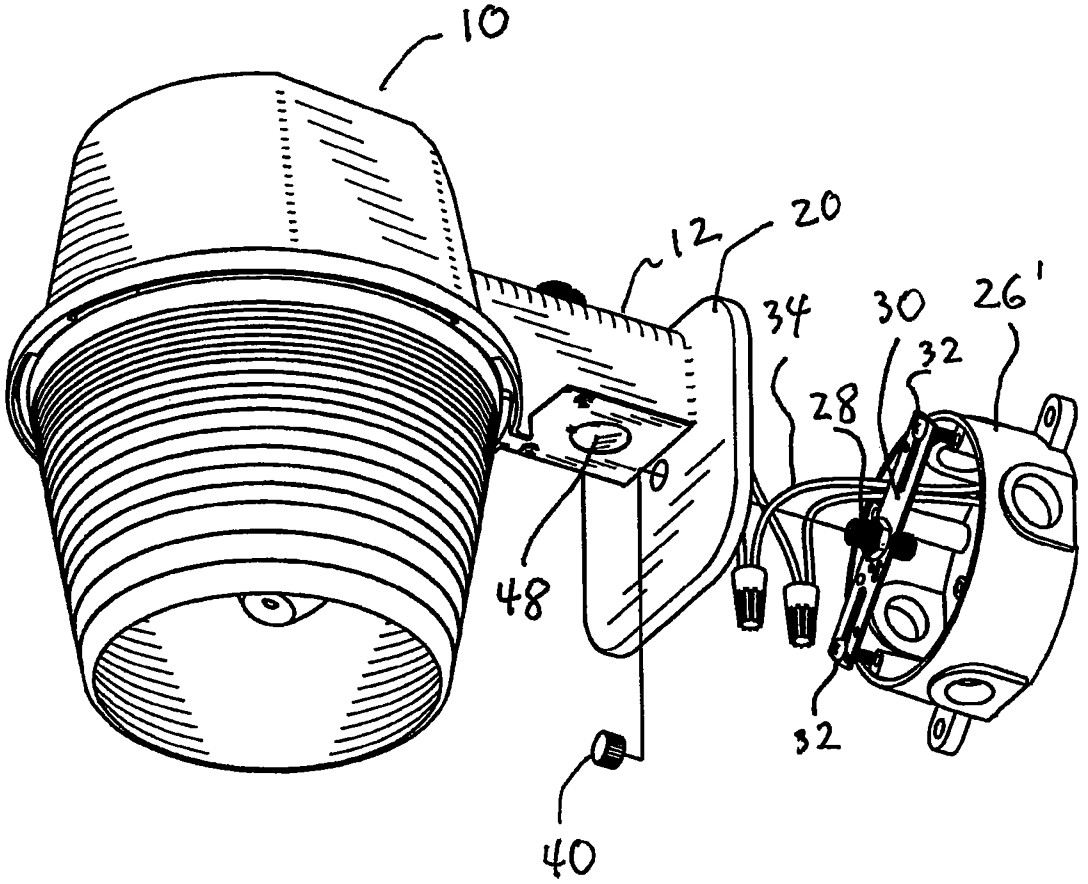
FIG. 11 is a front perspective view of the security light fixture of FIG. 1 in which the back plate has a different cross-sectional shape than that of the electrical outlet box.

Alternatively, as seen in FIGS. 10-11, when the area security light fixture 10 is mounted to a wall, pole, or building having a preexisting electrical junction box or J-box or outlet 26, 26', there is no conduit for the arm 12 to mount to, and the screws 24 in the back plate 20 are not strong enough to hold the full weight of the light fixture 10 onto the wall, pole, or building. The present invention in various embodiments thus provides an area security light fixture 10 that can be easily mounted to a junction box or outlet, or to a conduit without a junction box or outlet.

In one embodiment as seen in FIGS. 10-11, the back plate 20 of the area security light fixture 10 includes a reinforced area to receive a threaded nipple or stud 28. The threaded stud 28 screws into the center of a cross bar 30, which itself has mounting slots or holes 32 at opposite ends. Preferably, the threaded stud 28 is a hollow tube with a substantial wall thickness for strength and bending stiffness, and is made from steel.

The mounting slots or holes 32 of the cross bar 30 allow easy attachment of the cross bar 30 to an electrical junction box or a standard outlet box 26 with machine screws. The slots enable diametrical adjustment of those mounting screws to fit the size of the particular junction box. In order to carry the weight of the area security light fixture, the crossbar 30 is preferably made from hardened steel and may have greater thickness for improved strength.

In FIG. 10, a recessed or flush type junction box 26 is shown. In FIG. 11, a surface mount type junction box 26' is shown. The threaded stud 28 is screwed to the cross bar 30 at one end and the back plate 20 at the other end. A cap nut 40, wing nut, or the like holds the threaded stud 28 to the back plate 20. The area security light fixture 10 is thus mounted to the junction box or outlet box 26, 26'.

Also, the typical back plate for an area security light fixture has a cross-sectional shape (a triangle or square typically) that is similar to the cross-sectional shape (a triangle or square) of the arm. However, to adapt the area security light fixture 10 to a junction box 26, 26', the back plate 20 is not shaped like the cross-section of the arm 12, but its shape is selected to cover the junction box 26, 26'. Since most junction boxes 26, 26' have an opening that is round or square, the back plate 20 is preferably a large square shape to completely cover the opening so the interior of the junction box is not exposed to the weather.

Electrical wiring 34 carrying power to the light fixture 10 is connected to leads passing through an opening 36 in the back plate 20. These wiring leads extend along the inside of the arm 12 and originate from the electrical components contained in the housing 14.

Figure 2A:
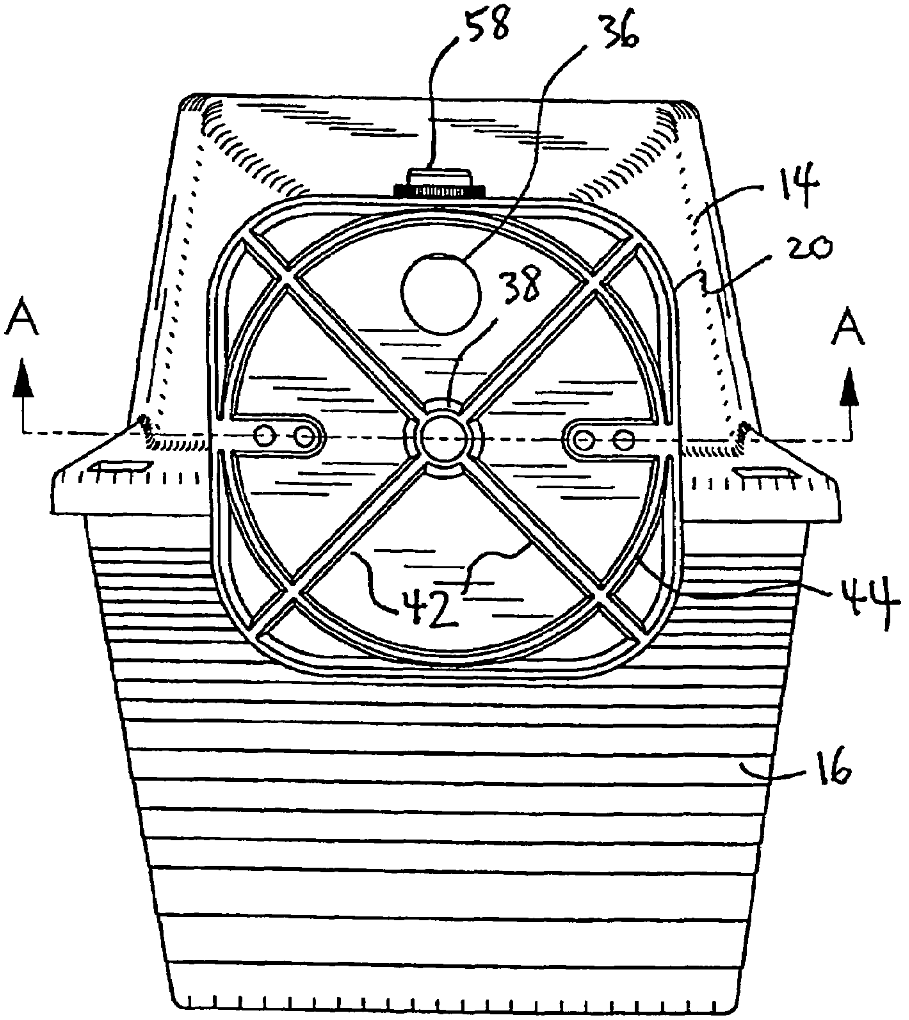
FIG. 2A is a back end view of the security light fixture of FIG. 1.
Figure 2B:
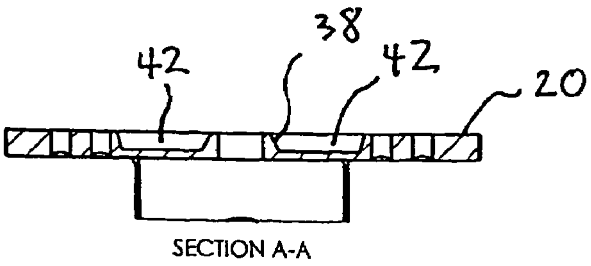
FIG. 2B is a cross-section taken along line A-A of FIG. 2A.

As seen in FIGS. 2A, 2B, there is an increased mass attachment boss 38 in the back plate 20 that receives the threaded stud 28. This reinforced boss 38 ensures that the stud 28 does not accidentally pull out, or the back plate 20 does not warp or distort under the cantilevered weight of the area security light fixture 10. In the preferred embodiment, the increased mass attachment boss 38 receiving the threaded stud 28 is a reinforced cone surrounding the threaded hole. The cone shaped attachment boss 38 focuses increased mass at the point where there is a large bending moment acting on the back plate 20. The preferred cone structure can be seen in the cross-sectional view of FIG. 2B, which is a cross-section taken along line A-A in FIG. 2A. The increased height of the boss 38 rising above the thickness of the surrounding or adjacent back plate increases the contact area between it and the threaded stud 28 to decrease stress in that area (since stress $\sigma$=F/A force over area) and distributes the bending moment along a greater contact length.

Further back plate reinforcing structures include optional ribs 42 arranged in a cross-cross or X, and/or a perimeter ring 44. A paper or rubber gasket, seal, or silicone bead can be added to the perimeter ring 44 to further seal out the environment. Other reinforcing structures known in the art may be used.

Moreover, in the preferred embodiment, the arm 12 and back plate 20 of the area security light fixture 10 are formed from cast metal for improved strength. In fact, the back plate 20, arm 12, and housing are preferably all cast in one step with one material. Thus, the back plate 20 and arm 12 are integral giving the necessary strength to support the heavy light fixture 10 without the use of a conduit 22, which conduit 22 when present would be the primary load bearing member.

The foregoing features are collectively used to reliably support the greater weight of area security light fixtures. Such fixtures rely on light sources such as metal halide, mercury vapor, high pressure sodium, fluorescent, or halogen that are typically of a great size, require heavy copper wiring and insulation, and with their starter, ballast, transformer, and glass or plastic lens or diffuser result in great weight, which typically range from about 7 to 20 pounds. Given such weights and typical arm lengths and from empirical observations, the bending moment that must be supported at the reinforced attachment boss 38 and supplemental support structures is typically at least about 60 in-lbf. (inch-pounds-force). Depending on the size and type of light source, the bending moment to be supported ranges preferably about 30-300 in.-lbf. and more preferably about 60-180 in.-lbf.

As seen in FIG. 9, the area security light fixture 10 of the present invention is readily adaptable for mounting to a wall, pole, or building having a conduit 22 supplying the electrical leads in place of a junction box 26, 26'. As described earlier, the conduit 22 is usually a metal pipe or tube installed by an electrician in an area where there is no electrical power. The conduit 22 holds electrical wiring 34 that carries power to the light fixture 10, which may be installed at a remote location at the top of a barn, or on a pole in the middle of an open field.

In the preferred embodiment, the arm 12 has a removable bottom plate 46 that is held in place by sheet metal screws 56 or the like. There is a punch-out opening 48 in the bottom plate 46. The punch-out opening 48 is normally covered by a blank, which is pre-scored or partially cut for easy detachment or opening by hammer blow or even finger pressure. The punch-out opening 48 is normally covered if not in use.

In FIG. 9, the conduit is inserted through the punch-out opening 48. If the end of the conduit 22 is already threaded, then a nut 52 can be advanced on to those threads to lock the plate 46 to the conduit 22. If the end of the conduit 22 is not threaded, an adapter 50 with a radial screw 54 is placed over the end as shown in FIG. 9. The radial screw 54 is advanced into contact with the conduit 22 locking the two parts together. Since the adapter 50 is threaded, the nut 52 can be advanced over those threads to hold the plate 46 to the conduit 22. The adapter may also be a self-threading type fitting that cuts into the pipe as it is advanced onto its end. Or the adapter may be a clamp that under its own material springback or under spring bias locks to the end of the conduit.

In another alternative embodiment, the tip of the conduit is not threaded, and a clamp is used instead of the nut 52, which clamp then holds the tip of the conduit 22 to the bottom plate 46. Such a clamp may be a lock down collar used in the automotive industry to secure the end of a radiator hose. In yet another embodiment, the unthreaded conduit 22 is inserted into the arm 12 where a bracket, ferrule, collar, recess, or the like is formed into the interior of the arm to receive the conduit tip. These structures together with the conduit provide the primary weight bearing capability.

Wood screws 24 can then secure the back plate 20 to the wall, pole, or building. Alternatively or in addition, a lag bolt or the like can be inserted through the attachment boss hole 38 in the back plate 20. This further holds the back plate 20 to the wall, pole, or building.

The electrical wiring from the fixture can be connected to the leads in the conduit 22. Next, the bottom plate 46 is installed back on the arm 12 using the supplied screws 56, tabs, rivets, or the like.

The present invention area security light fixture can therefore be easily adapted in the field for mounting to a junction box or to a conduit. In addition, the present invention system of mounting to a junction box does not interfere with the invention's system for mounting to a conduit, and vice versa.

Further modifications and improvements may additionally be made to the device and method disclosed herein without departing from the scope of the present invention. Accordingly, it is not intended that the invention be limited, except as by the appended claims.

What is claimed is:

1. A security light fixture comprising:

an electrical light source contained in a housing, wherein a lens is disposed beneath the housing;

a cantilevered arm extending from the housing having a profile smaller than the housing so that the arm does not block the lens;

a back plate on an end of the cantilevered arm, wherein the housing is spaced away from the back plate by the cantilevered arm, the back plate having a reinforced boss capable of supporting a bending moment of at least 60 in-lbf; and a bottom plate fitted to the bottom of the cantilevered arm, wherein the plate includes a punch-out area.

2. A security light fixture as defined in claim 1, wherein the back plate includes ribs that extend in a crossing pattern.

3. A security light fixture as defined in claim 1, wherein the back plate, arm, and housing are integrally formed.

4. A security light fixture as defined in claim 1, wherein the reinforced attachment boss includes a cone shape.

5. A security light fixture as defined in claim 1, wherein the fixture further comprises a cross bar for attaching the fixture to an electrical junction box.

6. A security light fixture as defined in claim 5, wherein the cross bar has a length, and the cross bar includes at least one mounting slot that extends along at least a portion of the length of the cross bar.

7. A security light fixture as defined in claim 5, wherein the cross bar includes at least one mounting hole.

8. A security light fixture as defined in claim 5, wherein a threaded stud attaches the cross bar to the back plate.

9. A security light fixture as defined in claim 1, wherein the back plate includes a perimeter ring.

10. A security light fixture as defined in claim 1, wherein the reinforced boss includes increased mass and a height greater than an adjacent thickness of the back plate.

11. A security light fixture as defined in claim 1, wherein the security light further comprises:

a cover;

a first mode for attaching the security light to an electrical junction box in which the cover covers the punch out area in the bottom plate; and a second mode for connecting a conduit to the security light, in which the cover is removed from the punch-out area in the bottom plate.

12. A security light fixture as defined in claim 1, wherein the security light weighs from about 7-20 pounds.

13. A security light fixture as defined in claim 1, wherein the security light includes a light source, a ballast, a transformer, and a starter, housed within the housing.

14. A security light and outlet box assembly comprising:

the security light fixture as defined in claim 5;

wherein the cross bar interconnects the electrical junction box and the back plate;

wherein the back plate includes a first cross-section, and the electrical junction box includes a second cross-section; and wherein the shape of the first cross-section is different than the shape of the second cross-section.

15. An adaptable security light fixture for attachment to an electrical junction box comprising:

a housing;

a light, a ballast, and a transformer housed within the housing;

a lens disposed beneath the housing projecting light at least 360° circumferentially;

a cantilevered arm extending from the housing to space the housing away from the electrical junction box having a reduced profile relative to the housing so as not to block the lens at least in the 360° circumference, wherein the arm includes a bottom plate with a pre-cut punch-out area;

a back plate integral to an end of the cantilevered arm wherein the back plate includes a reinforced cone-shaped boss;

a cross bar attached to the electrical junction box; and a stud attached to the reinforced boss at one end and the cross bar at an opposite end.

16. A security light fixture as defined in claim 15, wherein the back plate and the stud are capable of supporting a bending moment of about 60-180 in.-lbf.

17. An adaptable security light for attachment to an electrical junction box comprising:

a light source selected from the group consisting of metal halide, mercury vapor, high pressure sodium, and fluorescent, including electrical generation means contained with a housing located at one end of a cantilevered arm;

a lens disposed beneath the housing projecting light at least in a 360° circumference;

wherein the cantilevered arm has a reduced profile relative to the housing so as not to block light at least within the 360° circumference;

a bottom plate fitted to the bottom of the cantilevered arm having a circular, punch-out area;

a back plate disposed on an opposite end of the cantilevered arm, wherein the back plate includes a reinforced boss, and the back plate is spaced apart from the housing by the cantilevered arm;

a cross bar attached to the electrical junction box; and a stud interconnecting the reinforced boss to the cross bar.

18. A security light fixture as defined in claim 17, wherein the back plate and stud are capable of supporting a bending moment of about 30-300 in.-lbf.

* * * * *